(12) United States Patent
Hurd et al.

(10) Patent No.: US 8,927,468 B2
(45) Date of Patent: *Jan. 6, 2015

(54) SPRAY DRIED EMULSIFIER COMPOSITIONS, METHODS FOR THEIR PREPARATION, AND THEIR USE IN OIL-BASED DRILLING FLUID COMPOSITIONS

(75) Inventors: Phillip Wayne Hurd, Conyers, GA (US); Gary D. Fultz, Spring, TX (US); Jalandar Y. Jadhav, Daphne, AL (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/563,896

(22) Filed: Aug. 1, 2012
(Under 37 CFR 1.47)

(65) Prior Publication Data
US 2013/0079258 A1    Mar. 28, 2013

Related U.S. Application Data

(63) Continuation of application No. 11/333,535, filed on Jan. 18, 2006, now Pat. No. 8,258,084.

(51) Int. Cl.
| C09K 8/12 | (2006.01) |
| E21B 43/22 | (2006.01) |
| C09K 8/36 | (2006.01) |
| B01F 17/00 | (2006.01) |

(52) U.S. Cl.
CPC ............... *C09K 8/36* (2013.01); *B01F 17/005* (2013.01)
USPC ........... 507/265; 507/137; 507/138; 507/260; 507/263; 507/267; 166/305.1

(58) Field of Classification Search
None
See application file for complete search history.

(56) References Cited

U.S. PATENT DOCUMENTS

| 2,365,852 | A | 12/1944 | Agruss et al. |
| 2,819,996 | A | 1/1958 | Riley |
| 2,861,042 | A | 11/1958 | Watkins |
| 2,862,881 | A | 12/1958 | Reddie |
| 2,889,276 | A | 6/1959 | Barrett et al. |
| 2,946,746 | A | 7/1960 | Keller, Jr. |
| 3,015,632 | A | 1/1962 | Remer |
| 3,758,493 | A | 9/1973 | Maddox, Jr. |
| 3,804,760 | A | 4/1974 | Darley |
| 4,108,779 | A | 8/1978 | Carney |
| 4,119,738 | A | 10/1978 | Wagner et al. |
| 4,214,872 | A | 7/1980 | Uhrig et al. |
| 4,233,162 | A | 11/1980 | Carney |
| 4,374,737 | A | 2/1983 | Larson et al. |
| 4,508,628 | A | 4/1985 | Walker et al. |
| 4,637,883 | A | 1/1987 | Patel et al. |
| 4,658,036 | A | 4/1987 | Schilling |
| 4,663,076 | A | 5/1987 | Clapper et al. |
| 4,676,997 | A | 6/1987 | LaFay et al. |
| 4,839,096 | A | 6/1989 | Dennis et al. |
| 4,956,104 | A | 9/1990 | Cowan et al. |
| H935 | H | 7/1991 | Rines |
| 5,045,593 | A | 9/1991 | Cowan et al. |
| 5,072,794 | A | 12/1991 | Hale et al. |
| 5,076,364 | A | 12/1991 | Hale et al. |
| 5,076,373 | A | 12/1991 | Hale et al. |
| 5,083,622 | A | 1/1992 | Hale et al. |
| 5,085,282 | A | 2/1992 | Hale et al. |
| 5,096,883 | A | 3/1992 | Mercer et al. |
| 5,189,012 | A | 2/1993 | Patel et al. |
| 5,248,664 | A | 9/1993 | Hale et al. |
| 5,254,531 | A | 10/1993 | Mueller et al. |
| 5,260,269 | A | 11/1993 | Hale et al. |
| 5,322,630 | A | 6/1994 | Williams et al. |
| 5,330,662 | A | 7/1994 | Jahnke et al. |
| 5,401,424 | A | 3/1995 | Vinci et al. |
| 5,432,152 | A | 7/1995 | Dawson et al. |
| 5,580,592 | A | 12/1996 | Nassauer et al. |
| 5,837,654 | A | 11/1998 | Carroll et al. |
| 5,846,913 | A | 12/1998 | Sawdon |
| 5,869,433 | A | 2/1999 | Patel |
| 6,194,471 | B1 | 2/2001 | Crews et al. |
| 6,221,973 | B1 | 4/2001 | Arkens et al. |
| 6,308,788 | B1 | 10/2001 | Patel et al. |
| 6,405,809 | B2 | 6/2002 | Patel et al. |
| 6,422,325 | B1 | 7/2002 | Krieger |
| 6,461,999 | B1 | 10/2002 | Fanta et al. |
| 6,534,570 | B2 | 3/2003 | Farrow et al. |
| 6,620,770 | B1 | 9/2003 | Kirsner et al. |
| 6,635,108 | B1 | 10/2003 | Farrow et al. |
| 8,258,084 | B2 * | 9/2012 | Hurd et al. .................... 507/138 |
| 2003/0130135 | A1 | 7/2003 | Hou et al. |
| 2004/0171498 | A1 | 9/2004 | Miller |
| 2005/0037929 | A1 | 2/2005 | Kirsner et al. |
| 2005/0137093 | A1 | 6/2005 | Miller |
| 2007/0039520 | A1 | 2/2007 | Crews et al. |
| 2008/0060551 | A1 | 3/2008 | Crews et al. |

FOREIGN PATENT DOCUMENTS

WO    8911516 A1    11/1989

OTHER PUBLICATIONS

Simpson, et al, "The New Look in Oil-Mud Technology", J. Pet. Tech., pp. 1177-1183 (Dec. 1961).

* cited by examiner

*Primary Examiner* — John J Figueroa
(74) *Attorney, Agent, or Firm* — Ram W. Sabnis

(57) ABSTRACT

Spray dried emulsifier compositions are described, which have desirable emulsifying and wetting characteristics. Among other advantages, the solid particulate emulsifier compositions greatly reduce transportation costs and simplify the logistics and environmental concerns associated with shipping large volumes of solvent-containing liquids. The emulsifier comprises (1) a carboxylic acid terminated fatty amine condensate or (2) a modified tall oil or (3) a blend of (1) and (2) that is converted to its alkali or alkaline earth metal salt and spray dried.

37 Claims, No Drawings

SPRAY DRIED EMULSIFIER COMPOSITIONS, METHODS FOR THEIR PREPARATION, AND THEIR USE IN OIL-BASED DRILLING FLUID COMPOSITIONS

CROSS-REFERENCE TO RELATED APPLICATIONS

This application is a continuation of co-pending U.S. patent application Ser. No. 11/333,535, filed on Jan. 18, 2006, each of which is hereby incorporated by reference in its entirety.

FIELD OF THE INVENTION

The present invention relates to spray dried compositions comprising an alkali or alkaline earth metal salt of (1) a carboxylic acid terminated fatty amine condensate, or (2) a modified tall oil, or (3) a blend of (1) and (2). The spray dried compositions are advantageously employed as dry emulsifiers in invert emulsion drilling fluids.

BACKGROUND OF THE INVENTION

The oil and gas industries have used "drilling muds" or drilling fluids for a considerable number of years to tap subterranean deposits of natural resources. These drilling fluids are pumped under pressure, from tanks at the wellhead, through the inside of the drill pipe. At the bottom of the bore hole, the fluid exits through openings in the drill bit. The fluid then returns to the surface through the annular space between the drill string and wall of the bore hole (or wall of the casing, where it has been put in place). Upon reaching the wellhead, the fluid is usually subjected to a number of treatments to remove gases and/or solids (e.g., drill cuttings, sand, and colloidal material), prior to recirculation of some or all of the drilling fluid.

Drilling fluids provide several important functions, including cooling and lubricating the drill bit, establishing a fluid counterpressure to prevent high-pressure oil, gas, and/or water formation fluids from entering the well prematurely, and hindering the collapse of the uncased wellbore. Drilling muds also remove drill cuttings from the drilling area and transport them to the surface where they can be separated.

As the total reserves of oil diminish, it has become necessary to drill in areas which were previously inaccessible due to technological or economic difficulties. This has led to the widespread use of oil based drilling fluids, which offer greater thermal and chemical stability than water based fluids and therefore allow drilling at extended depths and in other demanding services, such as those involving exposure to high electrolyte concentrations and soluble gases. For example, oil based drilling fluids have been used successfully in drilling hot (e.g., greater than about 150° C. (300° F.)) formations as well as those containing hydrogen sulfide. Also, to maximize recovery from each platform in offshore drilling, oil based fluids are favored due to their effectiveness for drilling deviated (i.e., angled) wells. In particular, the high lubricity of oil based fluids is necessary because of the increased torques required in deviated drilling.

The nature of oil based muds (and particularly emulsion muds) and their use to minimize high temperature gellation, contamination (e.g., by gypsum and cement), and other problems have been described, for example, by Simpson, et al. J. PET. TECH., p. 1177 (December 1961). Oil based fluids are also applicable to the drilling of clays and shales (such as those found in Western Canada) for which water-based drilling fluids are unsuitable due to heaving or sloughing caused by water imbibition into these permeable formations. In general, oil based drilling fluids are adaptable to a wide variety of formation types and wellbore conditions. Low maintenance costs as well as the ability to recycle oil-based muds contribute to their economic justification.

In contrast to true oil muds, which contain only a small amount of water, invert emulsion drilling fluids commonly contain at least 5%, up to as much as 50%, by volume of water. The water is dispersed in invert emulsions as aqueous droplets throughout a continuous (i.e., external) oil or synthetic oil phase, which may contain diesel fuel or other liquid hydrocarbon mixtures (e.g., olefinic and/or paraffinic species in the $C_{16}$-$C_{18}$ range). The aqueous dispersed (i.e., internal) phase is normally a saline, aqueous solution (e.g., a chloride containing brine solution, such as a 30% calcium chloride brine).

Invert emulsion drilling fluids typically result from the blending of a hydrocarbon oil with water or brine under high shear conditions and in the presence of a suitable emulsifier. Emulsification is complete when there is no distinct layer of water in the fluid. The emulsifier is required not only to form a stable dispersion of water droplets in the oil phase, but also to maintain any solids such as weighting material additives (e.g., barites) or drill cuttings in an oil-wet state. Besides these weighting materials, solid additives that are often incorporated into invert emulsion systems include organoclays and other materials that increase fluid viscosity, reduce fluid loss to the surrounding formation, and/or help suspend drill cuttings. Other additives include those which improve filtration control, hinder wellbore collapse, increase oil-wetting of solids, provide temperature stability, develop gel strength, and/or control rheology.

With respect to emulsifiers and other additives used in invert emulsion drilling fluids, various liquid and solid formulations are described in the art. For example, U.S. Pat. No. 2,946,746 describes water-in-oil type emulsions comprising a polyamide emulsifying agent which may be prepared by reacting a polyethylene polyamine with a monobasic fatty acid in sufficient quantity to react with all of the amino groups of the polyethylene polyamine, thereby converting them to fatty acid amide groups.

U.S. Pat. No. 4,233,162 describes an emulsifier composition comprising a fatty acid amide, oleic acid, dimerized oleic acid, and a surfactant dispersant that may be a mixture of a second type of fatty acid amide and a waste lignin liquor derived from pulping wood.

U.S. Pat. No. 4,374,737 describes a drilling fluid composition that uses a nonpolluting oil (e.g., vegetable or mineral oil) and a concentrate that is added in an amount of about 3% by weight. The concentrate consists essentially of a diethanolamide, a tall oil fatty acid, and an imidazoline/amide mixture. Water may be added to the composition to provide an invert emulsion system.

U.S. Pat. No. 4,508,628 describes an invert oil emulsion drilling fluid containing a non-toxic biodegradable oil, an aqueous phase, and an emulsifier. The drilling fluid has defined characteristics which provide low viscosity at the high shear rates imparted to the fluid during drilling.

WO 89/11516 describes an oil based well working fluid comprising a hydrocarbon drilling oil in combination with a sodium, calcium, or magnesium brine. The emulsifier used comprises the reaction product of an amide-amine or a hydroxyalkyl amide with a dicarboxylic acid or an acid anhydride.

U.S. Pat. Nos. 4,956,104; 5,045,593; and related patents describe the use of organophilic derivatives of water soluble polymers, prepared by reacting the polymer with a phosphatide such as lecithin, as fluid loss additives for oil based well working fluids.

U.S. Pat. No. 5,096,883 describes a non-toxic drilling fluid which can be an emulsion of a base oil, an aqueous phase, and an emulsifying agent. The base oil consists essentially of branched-chain paraffins, which may contain ester functionalities, and has a number of defined properties. The drilling fluid avoids the use of aromatics, which are said to have potential environmental consequences.

U.S. Pat. No. 6,461,999 describes the use of lubricating additives for drilling fluids which avoid the need for certain undesirable emulsifiers, surfactants, solvents, or dispersants. The additives are prepared by steam jet cooking a mixture of starch, water, and a lubricant such as a polyalkylene.

U.S. Pat. No. 6,620,770 and related U.S. Patent Application Publication Nos. 2004/0171498; 2005/0137093; and 2005/0037929 describe emulsion stability and filtration control additives for invert emulsion drilling fluids. The additives are prepared by blending a carboxylic acid terminated polyamide with the Diels-Alder reaction product of dienophiles (e.g., carboxylic acids, polycarboxylic acids, or acid anhydrides) and a mixture of fatty acids and resin acids.

There is an ongoing need in the art for emulsifier compositions having desirable emulsifying properties for invert emulsions used for oil well drilling. With space at some well sites limited, such as on offshore platforms, and with increasing costs of transport of materials to a well site, there is industry wide interest particularly in drilling fluid compositions which can be formulated and maintained (i.e., stored) with minimal or fewer quantities of solvent and other additives, compared to prior art compositions.

BRIEF SUMMARY OF THE INVENTION

The present invention is based on the discovery of emulsifier compositions having desirable emulsifying and wetting characteristics and also which are advantageously formulated into solid particles by spray drying. Among other advantages, such solid particulate compositions greatly reduce transportation costs and simplify the logistics and environmental concerns associated with shipping large volumes of solvent-containing liquids. Moreover, the use, handling, and disposal of metal drums can be eliminated by packaging of the spray dried emulsifier composition in bags or other suitable packaging materials.

Spray dried emulsifier compositions of the present invention are easily incorporated into a variety of oil bases commercially used in drilling fluids. This allows one to choose a drilling mud based on the particular demands of the drilling operation (rather than based on compatibility with the solvent used in a conventional liquid emulsifier formulation). That is, the drilling operator is afforded considerable flexibility in choosing a desired solvent system. The fine particle size resulting from spray drying provides efficient dispersion and fast solubilization of the emulsifier in the oil phase and/or the aqueous phase of the drilling fluid, allowing for simple preparation of invert emulsions in the field or offshore. The level of alkali or alkaline earth metal salts in the spray dried compositions can be tailored to the requirements of a specific drilling operation, thereby minimizing or eliminating the use of hazardous or environmentally sensitive chemicals at the wellhead. Furthermore, the provision of the emulsifier in dry form eliminates the difficult handling of high viscosity liquids in low temperature drilling environments and also simplifies the addition of make-up emulsifier to depleted mud.

In one embodiment, the present invention is a method for preparing a spray dried emulsifier. The method comprises neutralizing (1) a carboxylic acid terminated fatty amine condensate or (2) a modified tall oil or (3) a blend of (1) and (2), to produce an aqueous composition. The carboxylic acid terminated fatty amine condensate is prepared by reacting a fatty acid amine condensate with a polycarboxylic acid or a carboxylic acid anhydride. Modified tall oil includes the reaction product of a tall oil distillate component with an unsaturated polycarboxylic acid or an unsaturated carboxylic anhydride. Modified tall oil also includes tall oil that is oxidized and/or dimerized. The method further comprises spray drying the aqueous composition to provide the dried emulsifier powder. In another embodiment the aqueous composition has, or is diluted with an aqueous diluent to provide, a solids content of at most about 40% prior to spray drying. In another embodiment, the spray drying is carried out at a temperature from about 180° C. (355° F.) to about 250° C. (480° F.). In another embodiment, the fatty acid amine condensate is prepared by condensing a mixture of fatty acids with a polyalkylene polyamine. In another embodiment, the molar ratio of carboxylic acid groups in the mixture of fatty acids:primary amine groups in the polyalkylene polyamine(s) is less than about 0.7:1. In another embodiment, the mixture of fatty acids, the polyalkylene polyamine, and the polycarboxylic acid or carboxylic acid anhydride are used in amounts from about 50% to about 90% by weight, from about 5% to about 25% by weight, and from about 3% to about 20% by weight, respectively, to prepare the carboxylic acid terminated fatty amine condensate.

In another embodiment, the present invention is a method as described above, comprising neutralizing a blend of (1) the carboxylic acid terminated fatty amine condensate and (2) the modified tall oil in a weight ratio of (1):(2) from about 1:4 to about 2:3, to produce an aqueous composition, which is then spray dried. In another embodiment, the carboxylic anhydride and the unsaturated carboxylic anhydride comprise maleic anhydride.

In another embodiment, the present invention is a method as described above, wherein the modified tall oil is the reaction product of a tall oil distillate component with an unsaturated polycarboxylic acid or an unsaturated carboxylic anhydride. In another embodiment, the tall oil distillate component comprises a mixture of a first tall oil distillate fraction and a second tall oil distillate fraction, wherein the mixture comprises from about 45% to about 90% by weight fatty acids and from about 10% to about 55% by weight rosin acids.

In another embodiment, the present invention is a spray dried emulsifier prepared according to any of the methods described above.

In another embodiment, the present invention is a spray dried emulsifier comprising an alkali or alkaline earth metal salt of (1) a carboxylic acid terminated fatty amine condensate or (2) a modified tall oil or (3) a blend of (1) and (2). The carboxylic acid terminated fatty amine condensate and the modified tall oil are as described above. In another embodiment, the spray dried emulsifier has a bulk density from about 0.24 g/ml (15 lb/ft$^3$) to about 0.56 g/ml (35 lb/ft$^3$). In another embodiment, the spray dried emulsifier has a moisture content of less than about 5% by weight. In another embodiment, the spray dried emulsifier has an average particle size from about 1 μm to about 75 μm.

These and other embodiments are apparent from the following Detailed Description.

DETAILED DESCRIPTION OF THE INVENTION

The emulsifier of the present invention comprises (1) a carboxylic acid terminated fatty amine condensate, (2) a modified tall oil, or (3) a blend of these components in any blending ratio, where the component or blend is neutralized (i.e., converted to its corresponding alkali or alkaline earth metal salt) and spray dried. Either of these components alone may be neutralized and spray dried (i.e., in the absence of any other component in quantities that would materially affect the basic and novel characteristics of the resulting spray dried formulation). Otherwise, blends of these components (i.e., in combination) may be similarly neutralized and spray dried.

The carboxylic terminated fatty amine condensate, if used in the spray dried emulsifier, is the reaction product of a fatty acid amine condensate with a polycarboxylic acid, a carboxylic anhydride, or a mixture of these. Suitable fatty acid amine condensates that may be carboxylated (or reacted to provide a carboxylic acid terminated derivative) include those that are synthesized by reacting a polyalkylene polyamine with a fatty acid. The polyalkylene polyamine that may be employed as a starting material includes compounds having the formula

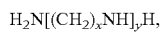

$$H_2N[(CH_2)_xNH]_yH,$$

where x and y are integers, typically from 1 to about 10. Representative polyalkylene polyamines are the polyethylene polyamines, where x in the formula above is 2. Of this class of polyalkylene polyamines, diethylenetriamine (x=2, y=2), triethylenetetramine (x=2, y=3), tetraethylenepentamine (x=2, y=4) and pentaethylenehexamine (x=2, y=5) are often used. Diethylenetriamine, triethylenetetramine, tetraethylenepentamine used individually are especially suitable. Mixtures of these polyalkylene polyamines may also be employed and are preferred.

Fatty acids that may be used to react with the polyalkylene polyamine described above and form a fatty acid amine condensate include the alkanoic and alkenoic fatty acids having from 10 to 24 carbon atoms such as lauric acid, myristic acid, palmitic acid, stearic acid, arachidic acid, behenic acid, oleic acid, linoleic acid, erucic acid, etc. Mixtures of fatty acids may also be used, including those which can be obtained in purified form from refining tall oil. As is known in the art, tall oil refers to the resinous yellow-black oily liquid obtained as an acidified byproduct in the kraft or sulfate processing of pine wood. Tall oil, prior to refining, is normally a mixture of rosin acids, fatty acids, sterols, high-molecular weight alcohols, and other alkyl chain materials. Distillation of crude tall oil is often used to recover a mixture of fatty acids in the $C_{16}$-$C_{20}$ range. The commercially available tall oil products XTOL®100, XTOL®300, and XTOL®304 (all from Georgia-Pacific Corp., Atlanta, Ga.), for example, all contain saturated and unsaturated fatty acids in the $C_{16}$-$C_{18}$ range, as well as minor amounts of rosin acids. Such products may be used in the reaction with a polyalkylene polyamine (or mixture of polyalkylene polyamines) described above. Other fatty acids and mixtures of fatty acids, including oxidized and/or dimerized tall oil, vegetable oils such as soybean oil, tallow fatty acids, etc., may also be employed.

Reaction between the polyalkylene polyamine and the fatty acid to form a fatty acid amine condensate proceeds at a temperature generally from about 125° C. (255° F.) to about 250° C. (480° F.), often from about 150° C. (300° F.) to about 180° C. (355° F.), and preferably from about 155° C. (310° F.) to about 170° C. (340° F.). As is known in the art, longer reaction times may be used to compensate for lower reaction temperatures. Normally, the condensation reaction, which generally yields a fatty acid amine condensate that is a fatty acid amidoamine, is essentially complete after a reaction time from about 0.5 hours to about 4 hours, typically from about 1 hour to about 3 hours. During the reaction, it may be desired to allow accumulated water, resulting from the condensation between the amine and the acid groups, to distill from the reaction mixture. Different reaction conditions (e.g., higher temperatures) may also be employed, as described, for example, in U.S. Pat. No. 3,758,493 to yield a fatty acid amine condensate that is a fatty acid imidazoline (e.g., a 1-aminoalkyl-2-alkyl-2-imidazoline). The fatty acid amine condensate thus may comprise a fatty acid amidoamine, a fatty acid imidazoline, or a mixture of these.

The molar ratio of carboxylic acid groups in the fatty acid(s) used to primary amine groups in the polyalkylene polyamine(s) used will determine the extent to which terminal, unreacted primary amine groups from the polyalkylene polyamine(s) are retained in the resulting fatty acid amine condensate. Generally, less than about 0.7 molar equivalents and often from about 0.4 to about 0.6 equivalents of carboxylic acid groups are used for the reaction, based on available primary amine groups. The reaction of carboxylic acid groups with secondary amine groups of the polyalkylene polyamine also occurs, but far less readily under the desired reaction conditions than reaction with terminal, primary amine groups. Often, about 0.5 equivalents of carboxylic acid are employed, resulting in, on average, about 1 unreacted primary amine group per fatty acid amine condensate (e.g., fatty acid amidoamine and/or fatty acid imidazoline).

The fatty acid amine condensate prepared as described above is then reacted with a polycarboxylic acid or carboxylic acid anhydride to convert all or substantially all, of its terminal amine groups into acid groups, thereby yielding a carboxylic acid terminated fatty amine condensate. Representative polycarboxylic acids include diacids such as maleic acid, fumaric acid, succinic acid, adipic acid, phthalic acid, etc. Representative carboxylic acid anhydrides include succinic anhydride and maleic anhydride, with the latter being especially suitable. When maleic anhydride is used to convert terminal amine groups to terminal carboxyl groups, the resulting carboxylic acid terminated fatty amine condensate is also referred to in the art as a "maleated reaction product" (e.g., a maleated fatty acid amidoamine or even simply a "maleated amidoamine").

The carboxylic acid terminated fatty amine condensate (e.g., the maleated fatty acid amidoamine) may be prepared by condensing a polycarboxylic acid or carboxylic acid anhydride (e.g., maleic anhydride) with the fatty acid amine condensate described above at a temperature generally from about 25° C. (75° F.) to about 100° C. (210° F.), often from about 50° C. (120° F.) to about 80° C. (175° F.), and preferably from about 60° C. (140° F.) to about 75° C. (165° F.). Usually, the condensation reaction is essentially complete after a reaction time from about 0.5 hours to about 4 hours, typically from about 1 hour to about 3 hours. Relative to the use of a carboxylic acid anhydride, the use of a (generally less reactive) polycarboxylic acid to convert terminal amine groups of the fatty acid amine condensate to terminal carboxylic acid groups often requires higher reaction temperatures and/or longer reaction times.

As is known in the art, the reaction to form the carboxylic acid terminated fatty amine condensate may proceed through dilution of the initially formed fatty acid amine condensate with a minor amount of a solvent prior to reaction with a polycarboxylic acid or carboxylic acid anhydride. In a representative embodiment of the invention, the fatty acid amine condensate is prepared by condensing a mixture of fatty acids (e.g., tall oil fatty acids) with a polyalkylene polyamine as described above, followed by reaction or condensation of the reaction product with the polycarboxylic acid or carboxylic acid anhydride to prepare the carboxylic acid terminated fatty amine condensate. The amounts of fatty acids, polyalkylene polyamine, and polycarboxylic acid or carboxylic acid anhydride that are generally used in the overall synthesis range from about 50% to about 90% by weight, from about 5% to about 25% by weight, and from about 3% to about 20% by weight, respectively. Where a mixture of amines and/or a mixture of polycarboxylic acids and/or carboxylic acid anhydrides is/are used, these ranges apply to the combined amounts in the mixture. After condensation, the resulting carboxylic acid terminated fatty amine condensate will generally have (or be adjusted to have) a solids content in the range from about 67% to about 95% and often from about 90% to about 93% (i.e., where the solvent-free system has 100% solids).

Either in place of, or in addition to, the carboxylic acid terminated fatty amine condensate described above, a modified tall oil may be neutralized to produce an aqueous composition that is ultimately spray dried to yield the emulsifier of the present invention. One particular type of modified tall oil is the reaction product of a tall oil distillate component with an unsaturated polycarboxylic acid and/or unsaturated carboxylic acid anhydride. Representative tall oil distillate components include tall oil fatty acids, tall oil rosin acids, and mixtures of these fractions. As described above, the refinement (i.e., fractionation) of tall oil can, for example, provide $C_{16}$-$C_{18}$ saturated and unsaturated fatty acids as well as fatty acid/rosin acid mixtures. In preparing modified tall oil, such tall oil distillate components, lighter (i.e., lower boiling) or heavier (i.e., higher boiling) components, or components having broader or narrower boiling point ranges may be used in the reaction with an unsaturated polycarboxylic acid and/or unsaturated carboxylic acid anhydride. Mixtures of tall oil distillate fractions may also be employed as the tall oil distillate component. Fatty acid/rosin acid mixtures in a desired ratio may be obtained in a single distillate fraction by adjusting tall oil fractionation conditions. Representative tall oil distillate components include the previously mentioned, commercially available products XTOL®100, XTOL®300, and XTOL®304, XTOL®520, and LYTOR®100 (all from Georgia-Pacific Corp., Atlanta, Ga.).

In one embodiment, for example, a mixture of a first tall oil distillate fraction comprising predominantly fatty acids (e.g., XTOL®100) and a second tall oil distillate fraction comprising predominantly rosin acids (e.g., LYTOR®100) may be blended in any proportion. In such a mixture, representative amounts of fatty acids and rosin acids range from about 45% to about 90% by weight and from about 10% to about 55% by weight, respectively. Representative weight ratios of the first tall oil distillate fraction:second tall oil distillate fraction range from about 3:2 to about 4:1. If such a blend is used to form modified tall oil via reaction with an unsaturated polycarboxylic acid and/or unsaturated polycarboxylic acid anhydride (e.g., maleic anhydride), suitable amounts of the acid or anhydride (or mixture thereof) will generally range from about 5% to about 30% by weight, usually from about 8% to about 15% by weight, based on the combined weight of the tall oil fractions and the acid and/or anhydride. Depending on the crude tall oil composition and fractionation conditions, a single tall oil distillate fraction may also suffice to yield a composition that is substantially the same as any of the blends of tall oil distillate fractions discussed above.

Representative unsaturated polycarboxylic acids that can react with the tall oil distillate component to yield the modified tall oil include the $C_4$-$C_{10}$ unsaturated dicarboxylic acids, such as maleic acid, fumaric acid, phthalic acid, trans-2-hexenedioic, trans-3-hexenedioic acid, cis-3-octenedioic acid, cis-4-octenedioic acid, and trans-3-octenedioic acid, etc. Representative unsaturated carboxylic acid anhydrides include maleic anhydride.

In preparing modified tall oil from the reaction of a tall oil distillate component and an unsaturated polycarboxylic acid and/or unsaturated carboxylic acid anhydride, a reaction temperature generally from about 150° C. (300° F.) to about 250° C. (480° F.), often from about 200° C. (390° F.) to about 230° C. (445° F.), and preferably from about 215° C. (420° F.) to about 225° C. (435° F.), is used. In general, the condensation reaction is essentially complete after a reaction time from about 12 hours to about 36 hours, and typically from about 20 hours to about 30 hours. Without being bound by theory, the unsaturated polycarboxylic acid or unsaturated carboxylic anhydride reacts with the tall oil distillate component at various sites of unsaturation (i.e., carbon-carbon double bonds), present in both reactants. For example, the reaction of maleic anhydride with an unsaturated tall oil fatty acid results in the addition of the anhydride ring to the acid at olefinic sites via the so-called "ene" reaction. The reaction of maleic anhydride with a rosin acid derived from tall oil, at diolefinic sites, forms a Diels-Alder addition product having a 6-membered ring with one site of unsaturation. The modified tall oil product generated from the reaction of maleic anhydride with a tall oil distillate component (comprising one or more tall oil distillate fractions) is sometimes referred to as a "maleated tall oil," which includes "maleated fatty acids" and "maleated rosin acids." Other types of modified tall oil include tall oil that is oxidized (e.g., blown (or air oxidized) tall oil or tall oil that is oxidized with oxygen, oxygen-enriched air, etc.), generally yielding dimerized tall oil fatty acids and even higher molecular weight products. A modified tall oil may also be obtained by catalytic dimerization (or polymerization) of the tall oil fatty acids. Modified tall oil also includes mixtures of (A) the reaction product of a tall oil distillate component with an unsaturated polycarboxylic acid and/or unsaturated carboxylic acid anhydride, together with (B) polymerized (e.g., dimerized) tall oil, obtained catalytically or via oxidation.

In a representative embodiment of the invention, the emulsifier is prepared from a blend of the carboxylic acid terminated fatty amine condensate and the modified tall oil described above, where the blend is neutralized (i.e., converted to an aqueous composition comprising its corresponding alkali or alkaline earth metal salt) and spray dried. Where such a blend is employed, the carboxylic acid terminated fatty amine condensate and modified tall oil are present in any blending ratio, but often in a weight ratio of carboxylic acid terminated fatty amine condensate:modified tall oil from about 3:2 to about 4:1. Also, in the case of a blend, the particular polycarboxylic acid or carboxylic acid anhydride used in preparing each of these components may be the same (e.g., they may both be fumaric acid) or different. In a representative embodiment of the invention where a blend is used, maleic anhydride is used to prepare both components.

The component(s) used to form the emulsifier of the present invention, namely (1) the carboxylic acid terminated fatty amine condensate, (2) the modified tall oil, or (3) a blend of these components, is acidic prior to neutralization. In the case of the carboxylic acid terminated fatty amine condensate, acidity results from the conversion of amine termini in the fatty acid amine condensate to carboxylic acid termini. In the case of the modified tall oil, acidity results from the addition of the unsaturated polycarboxylic acid and/or unsaturated carboxylic acid anhydride functionality (e.g., in the so-called "ene" reaction with tall oil fatty acids or in the Diels-Alder reaction with tall oil rosin acids). These acidic components (1) or (2) above, or the combination of (1) and (2), may be neutralized (or saponified) by the addition of a suitable base.

Neutralization with an alkali metal hydroxide, an alkaline earth metal hydroxide, an alkali metal oxide, an alkaline earth metal oxide, or a mixture these bases results in the conversion of the components (1) and/or (2) above to their corresponding alkali metal salts and/or alkaline earth metal salts (e.g., carboxylate salts). For example, the carboxylic acid terminal ends of the carboxylic acid terminated fatty amine condensate are reacted with any of these bases to form terminal metal carboxylate groups (e.g., sodium carboxylate groups). Suitable bases within the classes given above include the hydroxides and oxides of lithium, sodium, potassium, magnesium, calcium, and barium. Compared to the oxides, the hydroxides of these metals generally provide a faster and more efficient neutralization. Bases may be added in either solid form or solution form. Often, aqueous solutions are used, with a 25-75% by weight sodium hydroxide and 25-75% by weight calcium hydroxide solutions being representative. Mixtures of the above bases may also be used, preferably via a simultaneous neutralization reaction, although sequential reaction using different bases in series may also be employed. In a representative embodiment, in the case of an aqueous mixture of sodium hydroxide and calcium hydroxide, all of the acid value of the carboxylic acid terminated fatty amine condensate and/or the modified tall oil is neutralized a mixture of sodium hydroxide and calcium hydroxide. In any event, the amount of base required for neutralization may be determined from a stoichiometric determination or otherwise from direct analysis/monitoring of the solution acid value prior to and/or during neutralization. The acid value (in mg KOH/g required for neutralization) may be measured, for example, using ASTM D1980-87.

Neutralization with a base is carried out at a temperature from about 50° C. (120° F.) to about 100° C. (210° F.), and often from about 65° C. (150° F.) to about 80° C. (175° F.). The base is usually added gradually over a period from about 10 minutes to about 2 hours to avoid significant temperature deviations due to the heat release upon neutralization. Gradual addition is also suitable in view of the low initial aqueous solubility of the carboxylic acid terminated fatty amine condensate and/or modified tall oil, prior to saponification. Generally, at least the stoichiometric amount of base for complete neutralization is added. Subsequent to neutralization, the resulting aqueous composition generally has an alkaline pH, often in the range from about 8 to about 11.5. The aqueous composition is usually obtained in the form of a solution or dispersion.

After neutralization, the resulting aqueous composition comprising salts of (1) the carboxylic acid terminated fatty amine condensate, (2) the modified tall oil, or (3) a blend of these components, as described above, is spray dried. The viscosity of the aqueous composition required for good spray drying performance (and ultimately good spray dried product characteristics) is normally achieved by adjusting (e.g., by dilution) its solids content, prior to spray drying, to at most about 50% by weight, and often to at most about 40% by weight. A solids level from about 20% to about 40% prior to spray drying is exemplary. Generally, a solids content below about 15% is not desirable due to the increased energy requirements associated with spray drying, without any corresponding improvement in either the processing of the aqueous composition or the characteristics of the spray dried product. If required to achieve the desired solids level from a more concentrated aqueous composition, the solids content may be conveniently adjusted by adding an aqueous diluent (e.g., water). In some cases it may be possible to avoid a separate dilution (or solids adjustment) step if sufficient water is added with the base during neutralization. In general, however, diluting the base significantly below a concentration of 50% by weight can complicate and slow the neutralization step. This is due to the lack of appreciable solubility of the carboxylic acid terminated fatty amine condensate and/or the modified tall oil in aqueous media, prior to neutralization.

After neutralization, spray drying of the aqueous composition provides a solid emulsifier composition of the present invention, having a number of advantages, including those described previously, over conventional liquid and solid emulsifier compositions. The aqueous composition comprising the neutralized (i.e., the alkali metal salt or alkaline earth metal salt of the) carboxylic acid terminated fatty amine condensate and/or the modified tall oil is fed to the spray drier head, which is generally heated (e.g., using natural gas) to provide a spray drier inlet (or maximum) temperature from about 160° C. (320° F.) to about 250° C. (480° F.). Often this inlet temperature (or simply the "spray drying temperature") is within the range from about 180° C. (355° F.) to about 225° C. (435° F.), where higher temperatures directionally allow for higher throughput of the aqueous composition to be spray dried. Spray drying involves atomization, using an appropriate rotary or nozzle atomizer, of this aqueous composition. Rotary atomization, for example, is often carried out by contacting the solution with a wheel rotating at 30,000-50,000 rpm to produce the required spray. Upon contact of the spray with hot air in the spray dryer chamber, the moisture is quickly evaporated into an exhaust stream. The resulting solid, free flowing particles of the spray dried emulsifier are discharged continuously from the bottom of the conical chamber. The outlet temperature of the spray drier is typically in the range from about 75° C. (165° F.) to about 100° C. (210° F.). Representative spray dryers include those supplied by Niro, A/S (Soeborg, Denmark).

As discussed previously, the spray dried emulsifier generally has a number of desirable properties which include the ease of its preparation and packaging. Physical characteristics, such as a small particle size, provide excellent dispersion and solubilization of the spray dried emulsifier in drilling fluids. Particle sizes obtained for the spray dried emulsifier often vary from submicron (e.g., 0.5 µm) to greater than 100 micron (e.g., 150 µm) diameters. The weight average particle size generally ranges from about 1 µm to about 75 and often from about 10 µm to about 50 µm. As is understood in the art, the weight average particle size refers to the particle diameter which 50% of the weight of the particles exceed and 50% of the weight of the particles fall below. This parameter may be measured, for example, using a light scattering particle size distribution analyzer, such as those manufactured by Horiba Instruments, Inc. (Irvine, Calif.). The spray dried emulsifier also has a low bulk density, generally ranging from about 0.24 g/ml (15 lb/ft$^3$) to about 0.56 g/ml (35 lb/ft$^3$), and often from about 0.40 g/ml (25 lb/ft$^3$) to about 0.48 g/ml (30 lb/ft$^3$).

The spray dried emulsifier normally has a residual moisture content of less than about 10% by weight, and often from about 2% to about 5% by weight. The powder produced as a result of spray drying may be tacky in some instances, although this is not generally the case. If desired, silica or other anti-caking or anti-clumping agent known in the art may be added to the powder, for example in an amount ranging from 0.1% to 2% by weight. Otherwise, additional drying may be used. The spray dried product is free flowing and may be stored for extended periods in the absence of exposure to moisture (e.g., in vapor barrier bags) without "re-massing" or significant agglomeration of the solid particles. This is based on oven aging studies of the spray dried emulsifier, used to simulate extended storage at high ambient temperatures. The addition of water to the spray dried emulsifier will normally result in a basic mixture, having a pH from about 8 to about 11.

Invert emulsions for drilling applications are prepared by combining the spray dried emulsifier of the present invention, an oil based or hydrocarbon continuous phase, and an aqueous dispersed phase (e.g., water or an aqueous brine solution). Usually, the emulsifier first is dissolved in either the oil phase or the aqueous phase, and the aqueous phase is then gradually added to the oil phase with vigorous mixing. The converse method (i.e., addition of the oil phase to the aqueous phase) or alternate addition of the two phases may likewise be employed. In any event, the resulting mixture will generally comprise from about 1% to about 5% by weight of the spray dried emulsifier and from about 5% to about 40% by weight of the aqueous phase, with the balance being the oil phase. The amount of emulsifier required to produce a stable emulsion in any given application will depend on the relative proportions of the oil and aqueous phases as well as upon the chemical nature of the respective phases and the particular manner in which the emulsion is prepared.

To prepare the emulsion, the mixture of spray dried emulsifier, aqueous phase, and oil phase is subjected to high shear conditions to provide the invert emulsion. Any of a wide variety of slow or high speed mixers or agitators, homogenizers, colloid mills, etc. may be used to obtain the degree of contact between the phases, required to disperse the internal aqueous phase in the external oil phase. If desired, the rate of dispersion may be increased by emulsifying at somewhat elevated temperatures.

The spray dried emulsifier is compatible with any of a number of oil bases typically used in invert emulsions, including diesel oil and other hydrocarbons, such as $C_{14}$-$C_{20}$ paraffins, iso-paraffins, olefins, iso-olefins, aromatics, naphthalenes, and other hydrocarbon mixtures including various products of crude oil refining. For the aqueous phase, a brine solution is often used, with representative brine solutions containing sodium chloride, potassium chloride, magnesium chloride, calcium chloride, or mixtures of these in amounts up to saturation of the aqueous phase. Typical salt concentrations range from about 20% by weight to about 35% by weight of the aqueous phase. Dissolved salts in the aqueous phase can be used, for example, to increase drilling fluid density, decrease swelling effects of aqueous matter on formation clays, and reduce hole enlargement caused by the dissolution of water soluble formation components.

When the emulsion is to contain suspended solids (e.g., a clay) or other additive(s), these are typically added after the emulsion is prepared under high shear conditions, rather than to one phase or the other. Additives may be introduced simultaneously or sequentially, and accompanied by continuous mixing or agitation. For example, a weighting material which increases the density of the drilling fluid may be added. The weighting agent may be any of the high density materials conventionally employed (e.g., barites, whiting, calcined clay, etc.) to achieve a desired density (e.g., 1.05-2 g/ml or 65-125 lbs/ft$^3$). Other solid additives include organoclays to help suspend drill cuttings.

Fluid loss additives, which serve to increase viscosity and prevent the escape of the fluid into permeable formations traversed by the well bore, may be incorporated into the invert emulsion. The amount added should not increase the viscosity of the composition to such an extent that efficient pumping of the drilling fluid is compromised. The fluid loss component additive is usually a hydratable clay or clay-like material, although asphalt, carbon black, or any conventional additive may be used. High quality clays such as bentonite, montmorillonite, and kaolinite are often employed. Other conventional additives, including filter loss agents, other viscosifiers, wetting agents, stabilizers, gel strength and rheological control agents, etc. may be incorporated into to the invert emulsion drilling fluid.

All references cited in this specification, including without limitation, all U.S., international, and foreign patents and patent applications, as well as all abstracts and papers (e.g., journal articles, periodicals, etc.), are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references. In view of the above, it will be seen that several advantages of the invention are achieved and other advantageous results obtained.

As various changes could be made in the above methods and compositions without departing from the scope of the invention, it is intended that all matter contained in this application, including all theoretical mechanisms and/or modes of interaction described above, shall be interpreted as illustrative only and not limiting in any way the scope of the appended claims.

The following examples are set forth as representative of the present invention. These examples are not to be construed as limiting the scope of the invention as these and other equivalent embodiments will be apparent in view of the present disclosure and appended claims.

Example 1

A first component comprising a carboxylic acid terminated fatty amine condensate, was prepared according to procedures described herein. In particular, tall oil fatty acids (TOFA) were reacted with diethylenetriamine (DETA) to yield a fatty acid amine condensate, namely a fatty acid amidoamine. The unreacted amine termini of this fatty acid amidoamine were then converted to carboxylic acid termini through subsequent reaction with maleic anhydride (MA). In a 500 ml reaction vessel, 85.2 grams of the resulting carboxylic acid terminated fatty amine condensate were then blended with 214.8 grams of a second component comprising a mixture of tall oil fatty acids and tall oil rosin acids, in an approximately 70:30 weight ratio, which had been reacted with MA. The second component is also referred to as a mixture of maleated tall oil fatty acids and maleated tall oil rosin acids. Blending of these components was carried out for about 30 minutes, with gradual heating of the blend to a temperature of 60-70° C. (140-160° F.).

After the initial blending and heating of the first and second components, 180.8 grams of KOH solid was gradually added over a 15 minute period to saponify the blend. After addition of the complete charge of solid KOH, the temperature of the blend was increased to 120° C. (250° F.) over a 15-20 minute period and held at that temperature for an additional 15 minutes. Complete neutralization was confirmed based on a measured acid value of 0 mg KOH/g for the blend.

Example 2

A 91.1 gram portion of the saponified blend of the first and second components, as prepared in Example 1 (but after a period of drying to increase the solids content), was diluted with 108.9 grams of water to provide 200 grams of solution having a 40% solids content. The solution was then spray dried according to procedures described herein using a portable spray dryer (800×600 mm; 60° cone angle) having a rotary atomizer (available from Niro, A/S (Soeborg, Denmark)) to form a spray dried emulsifier having the following properties: water content=2.0 wt-%; bulk density=0.32 g/ml (20.2 lb/ft$^3$); color=cream; melting point=280° C. (535° F.); pH (upon mixing of 1 part with 2 parts of water)=9.31.

Example 3

A 100.9 gram portion of the saponified blend of the first and second components, as prepared in Example 1, was diluted with 99.1 grams of water to provide 200 grams of solution having about 40% solids content, based on the estimated moisture level of the solid. The solid and water were mixed and shaken in a jar to obtain a uniform solution.

The solution was then spray dried according to procedures described herein, using the spray dryer described in Example 2 with 170° C. (340° F.) inlet and 90° C. (195° F.) outlet temperatures to form a spray dried emulsifier. About 0.5 wt-% of silica was added to the product as an anticaking agent. The spray dried emulsifier had the following properties: water content=6.0 wt-%; bulk density=0.50 g/ml (30.9 lb/ft$^3$); color=yellow; melting point=280° C. (535° F.); pH (upon mixing of 1 part with 2 parts of water)=12.98.

Example 4

A carboxylic acid terminated fatty amine condensate was prepared from TOFA, DETA, and maleic anhydride according to procedures described herein. In particular, TOFA was charged to a reaction vessel and gradually heated to about 100° C. (210° F.). At this point, DETA was added over a period of about 10 minutes, after which time the reaction mixture temperature increased to about 125° C. (260° F.). The reaction mixture was further heated to a temperature of 150° C. (300° F.) over a 20 minute period and held at that temperature for 90 minutes to complete the acid/amine condensation reaction and form a fatty acid amidoamine.

The reaction mixture was then cooled gradually to 90° C. (195° F.). Maleic anhydride was introduced into the reaction mixture over a 40 minute period to convert the unreacted amine terminal ends of the fatty acid amidoamine to carboxyl terminal ends. After 90 minutes of reaction at about 90° C. (195° F.), the measured amine number of the reaction mixture was 0 mg KOH/g, indicating complete conversion of the amine terminal ends. The measured acid value of the mixture was 98.6 mg KOH/g.

A second component, described in Example 1 (comprising a mixture of tall oil fatty acids and tall oil rosin acids, in an approximately 70:30 weight ratio, which had been reacted with MA), was added to the reaction vessel to form a homogeneous blend. The resulting mixture was allowed to cool to room temperature. The final acid value of the blend was 226.4 mg KOH/g.

Example 5

A portion of the blend, prepared in Example 4, was added to a 5 liter reaction vessel. The blend was heated to a temperature of 50-55° C. (120-130° F.) over a 30 minute period. A 240 gram charge of 50 wt-% NaOH solution was charged to the reaction vessel over 10 minutes, after which the blend temperature increased to about 90° C. (195° F.). A 120 gram portion of water was then added. Saponification at this temperature continued with additions of 203 grams of 12.5 wt-% Ca(OH)$_2$ solution (to obtain a pH of 8.97 and an acid value of 13.2 mg KOH/g) followed by 15 grams of 50 wt-% NaOH solution (to obtain a pH of 9.67 and an acid value of 5.1 mg KOH/g).

The saponified blend was then diluted with an equal weight of water and the resulting solution was spray dried according to procedures described herein, using the spray dryer described in Example 2 with a 162° C. (325° F.) inlet temperature to form a spray dried emulsifier. Blend preparation conditions and final product properties are summarized in Table 1.

Example 6

A 420 gram portion of the second component described in Example 1 (comprising a mixture of tall oil fatty acids and tall oil rosin acids, in an approximately 70:30 weight ratio, which had been reacted with MA), was blended with 180 grams of a carboxylic acid terminated fatty amine condensate. Blending was performed over 1 hour at 60° C. (140° F.). The resulting blend had a measured acid value of 198.5 mg KOH/g. The blend was then saponified at 65-95° C. (150-205° F.) by initially adding 168.4 grams of 50 wt-% NaOH solution at a slow rate. At this point, the reaction blend had a measured acid value of 23.9 mg KOH/g and a pH of 8.58. An additional 25.6 gram portion of 50 wt-% NaOH solution was then added to complete the neutralization.

The saponified blend was then diluted by the addition of 388 grams of water over 1 hour, such that the resulting solids content was calculated to be 59 wt-%. An additional 809 grams of water was added thereafter to reduce the calculated solids level to 35 wt-% and provide a viscosity more suitable for subsequent spray drying. The solution was spray dried according to procedures described herein, using the spray dryer described in Example 2 with a 162° C. (325° F.) inlet temperature to form a spray dried emulsifier. Blend preparation conditions and final product properties are summarized in Table 1.

Example 7

A 602 gram portion of commercially available XTOL®692 (Georgia-Pacific Corp., Atlanta, Ga.) was blended with 258 grams of a carboxylic acid terminated fatty amine condensate. The product XTOL®692, like the second component described in Example 1, comprised a mixture of tall oil fatty acids and tall oil rosin acids, in an approximately 70:30 weight ratio, which had been reacted with MA. The difference between the Example 1 formulation and XTOL®692 resided in the amount of maleic anhydride which was reacted with the tall oil distillate fractions (i.e., the level of maleation).

Blending and saponification were performed according to procedures in Example 6, but with the addition of 288.9 grams of 50 wt-% NaOH solution rather than a total of 194 grams of solution. The saponified blend was then diluted by the addition of 1720.8 grams of water to achieve a calculated solids level of 35 wt-% and provide a viscosity more suitable for subsequent spray drying. The solution was spray dried according to procedures described herein, using the spray dryer described in Example 2 with a 162° C. (325° F.) inlet temperature to form a spray dried emulsifier. Blend preparation conditions and final product properties are summarized in Table 1.

Example 8

Another blend of the XTOL®692 and a carboxylic acid terminated fatty amine condensate was prepared according to procedures in Example 7, except that the total amount of these components used was 850 grams rather than 860 grams.

Blending and saponification were performed according to procedures in Example 6, but with the addition of 288.9 grams of 50 wt-% NaOH solution rather than a total of 194 grams of solution. The saponified blend was then diluted by the addition of 1812.4 grams of water to achieve a calculated solids level of 33 wt-% and provide a viscosity more suitable for subsequent spray drying. The solution was spray dried according to procedures described herein, using the spray dryer described in Example 2 with a 180° C. (355° F.) inlet temperature to form a spray dried emulsifier. Blend preparation conditions and final product properties are summarized in Table 1.

Example 9

Another blend of XTOL®692 and a carboxylic acid terminated fatty amine condensate was prepared according to procedures in Example 8, except that the amounts of these components used were 140 grams and 55.62 grams, respectively.

Blending and saponification were performed according to procedures in Example 8, but the addition of 156.5 grams of 25 wt-% solution of a mixture of 75/25 w/w NaOH and Ca(OH)$_2$, rather than 288.9 grams of 50 wt-% NaOH solution. The saponified blend was then diluted by the addition of 296.7 grams of water to achieve a calculated solids level of 35 wt-% and provide a viscosity more suitable for subsequent spray drying. The solution was spray dried according to procedures described herein, using the spray dryer described in Example 2 with a 162° C. (325° F.) inlet temperature to form a spray dried emulsifier. Blend preparation conditions and final product properties are summarized in Table 1.

Example 10

A 200.0 gram sample of XTOL®692 was saponified by adding 76.6 grams of 50 wt-% NaOH solution under conditions described in Example 6. The saponified product was then diluted by the addition of 442.6 grams of water to achieve a calculated solids level of 35 wt-% and provide a viscosity more suitable for subsequent spray drying. The solution was spray dried according to procedures described herein, using the spray dryer described in Example 2 with a 200° C. (390° F.) inlet temperature to form a spray dried emulsifier. Blend preparation conditions and final product properties are summarized in Table 1.

Example 11

A 200.0 gram sample of commercially available LATOL®MTO (Georgia-Pacific Corp., Atlanta, Ga.) was saponified by adding 54.0 grams of 50 wt-% NaOH solution under conditions described in Example 6. The product LATOL®MTO comprised a mixture of tall oil fatty acids and tall oil rosin acids, in an approximately 1:1 ratio, which has been further reacted by oxidation to produce a higher molecular weight modified tall oil product. The saponified product was then diluted by the addition of 421.0 grams of water to achieve a calculated solids level of 35 wt-% and provide a viscosity more suitable for subsequent spray drying. The solution was spray dried according to procedures described herein, using the spray dryer described in Example 2 with a 200° C. (390° F.) inlet temperature to form a spray dried emulsifier. Blend preparation conditions and final product properties are summarized in Table 1.

Example 12

A 200.9 gram sample of modified tall oil fatty acids was saponified by adding 49.2 grams of 50 wt-% NaOH solution under conditions described in Example 6. The modified tall oil fatty acids comprised tall oil fatty acids which were further reacted with polycarboxylic acids or carboxylic acid anhydrides. The saponified product was then diluted by the addition of 465.5 grams of water to achieve a calculated solids level of 30 wt-% and provide a viscosity more suitable for subsequent spray drying. The solution was spray dried according to procedures described herein, using the spray dryer described in Example 2 with a 200° C. (390° F.) inlet temperature to form a spray dried emulsifier. Blend preparation conditions and final product properties are summarized in Table 1.

The ability to prepare spray dried emulsifiers of the present invention according to the procedures described herein, as well as the excellent properties of the products obtained, are evident from the preparation conditions and results of Examples 5-12, summarized below in Table 1, as well as those of the other examples described herein. In all cases, a flowable (i.e., non-agglomerated), solid particulate spray dried product was obtained, even in those cases where oven aging at 122° C. (252° F.) was performed to simulate a hot, extended storage period.

TABLE 1

| I.D. | Example 5 | Example 6 | Example 7 | Example 8 | Example 9 | Example 10 | Example 11 | Example 12 |
|---|---|---|---|---|---|---|---|---|
| FORMULATION | | | | | | | | |
| Blend Component A | XTOL ®691 | XTOL ®691 | XTOL ®692 | XTOL ®692 | XTOL ®692 | XTOL ®692 | LATOL ®MTO | Modified Tall Oil Fatty Acid |
| Blend Component B | Fatty amine condensate-COOH | fatty amine condensate-COOH | fatty amine condensate-COOH | fatty amine condensate-COOH | fatty amine condensate-COOH | None | none | none |
| Saponification | NaOH, Ca(OH)$_2$ | NaOH | NaOH | NaOH | NaOH, Ca(OH)$_2$ | NaOH | NaOH | NaOH |
| Solids, wt-% (after dilution) | 35 | 35 | 35 | 33 | 35 | 35 | 35 | 35 |
| Spray Dry Temp, ° C. | 162 | 162 | 162 | 180 | 162 | 200 | 200 | 200 |
| PRODUCT PHYSICAL PROPERTIES | | | | | | | | |
| Feel | tacky | tacky | non tacky | non tacky | non tacky | non tacky | slightly tacky | non tacky |
| pH (2:1) | 9.36 | 10.41 | 10.62 | 10.62 | 10.42 | 9.28 | 10.66 | 8.94 |
| Water, wt-% | 3.13 | 1.73 | 3.56 | 3.10 | 2.66 | 4.00 | 4.52 | 1.46 |

TABLE 1-continued

| I.D. | Example 5 | Example 6 | Example 7 | Example 8 | Example 9 | Example 10 | Example 11 | Example 12 |
|---|---|---|---|---|---|---|---|---|
| Bulk Density, lb/ft$^3$ | 19.8 | 30.0 | 27.0 | 27.0 | 20.7 | 30.9 | 26.2 | 32.4 |
| Appearance | cream powder | yellow powder | yellow powder | yellow powder | yellow powder | cream powder | brown powder | yellow powder |
| After Drying 122° C., 24 hr | flowable | flowable | flowable | flowable | flowable | N/A | N/A | N/A |

What is claimed is:

1. A method for preparing a spray dried emulsifier, comprising:
spray drying a neutralized composition to produce a spray dried emulsifier, wherein the neutralized composition comprises a mixture of a carboxylic acid terminated fatty amine condensate, a modified tall oil, and water and has a pH of about 8 to about 11.5, and wherein the carboxylic acid terminated fatty amine condensate is prepared by reacting a fatty acid amine condensate with a polycarboxylic acid or a carboxylic acid anhydride.

2. The method of claim 1, wherein the neutralized composition has a solids content of about 50% by weight or less.

3. The method of claim 1, further comprising condensing a mixture comprising one or more fatty acids and one or more polyalkylene polyamines to prepare the fatty acid amine condensate.

4. The method of claim 1, further comprising reacting a tall oil distillate component with an unsaturated polycarboxylic acid or an unsaturated carboxylic anhydride to prepare the modified tall oil.

5. The method of claim 4, wherein the unsaturated carboxylic anhydride comprises maleic anhydride.

6. The method of claim 1, wherein the spray drying is carried out at a temperature from about 180° C. to about 250° C.

7. The method of claim 1, further comprising adding a base selected from the group consisting of an alkali metal hydroxide, an alkaline earth metal hydroxide, an alkali metal oxide, an alkaline earth metal oxide, and mixtures thereof to the mixture of the carboxylic acid terminated fatty amine condensate, the modified tall oil, and water to prepare the neutralized composition.

8. The method of claim 7, wherein the base is selected from the group consisting of lithium hydroxide, sodium hydroxide, potassium hydroxide, magnesium hydroxide, calcium hydroxide, barium hydroxide, and mixtures thereof.

9. The method of claim 8, wherein the base comprises a mixture of sodium hydroxide and calcium hydroxide.

10. The method of claim 1, wherein the spray dried emulsifier has an average particle size of about 0.5 µm to about 150 µm, and wherein the modified tall oil comprises oxidized tall oil, dimerized tall oil, or a mixture thereof.

11. The method of claim 1, further comprising reacting a tall oil distillate component with an unsaturated polycarboxylic acid or an unsaturated carboxylic anhydride to prepare the modified tall oil, wherein the tall oil distillate component comprises about 45% by weight to about 90% by weight fatty acids.

12. The method of claim 1, wherein the neutralized composition is an aqueous solution or an aqueous dispersion.

13. The method of claim 1, wherein the neutralized composition has a solids content of about 40% by weight or less.

14. The method of claim 1, wherein the blend comprises the carboxylic acid terminated fatty amine condensate and the modified tall oil in a weight ratio of about 1:4 to about 2:3.

15. A spray dried emulsifier prepared according to the method of claim 1.

16. The spray dried emulsifier of claim 15, wherein the spray dried emulsifier has an average particle size of about 1 µm to about 75 µm.

17. A spray dried emulsifier comprising a blend of an alkali metal salt or an alkaline earth metal salt of a carboxylic acid terminated fatty amine condensate and an alkali metal salt or an alkaline earth metal salt of a modified tall oil, wherein the carboxylic acid terminated fatty amine condensate is prepared by reacting a fatty acid amine condensate with a polycarboxylic acid or a carboxylic acid anhydride, and wherein the spray dried emulsifier has an average particle size of about 0.5 µm to about 150 µm.

18. The spray dried emulsifier of claim 17, wherein the spray dried emulsifier has an average particle size of about 1 µm to about 75 µm.

19. The spray dried emulsifier of claim 17, wherein the modified tall oil comprises oxidized tall oil or dimerized tall oil.

20. The spray dried emulsifier of claim 17, wherein the spray dried emulsifier further comprises water in an amount sufficient to provide a basic mixture having a pH of about 8 to about 11.

21. The spray dried emulsifier of claim 17, wherein the carboxylic acid terminated fatty amine condensate is prepared by reacting the fatty acid amine condensate with the carboxylic acid anhydride.

22. The spray dried emulsifier of claim 17, wherein the modified tall oil is prepared by reacting a tall oil distillate component with an unsaturated polycarboxylic acid or an unsaturated carboxylic anhydride.

23. The spray dried emulsifier of claim 17, wherein the blend comprises the carboxylic acid terminated fatty amine condensate and the modified tall oil in a weight ratio of about 1:4 to about 2:3.

24. The spray dried emulsifier of claim 17, wherein the spray dried emulsifier has a bulk density of about 0.24 g/ml to about 0.56 g/ml.

25. The spray dried emulsifier of claim 17, wherein the spray dried emulsifier has a moisture content of less than 5% by weight.

26. A method for preparing an invert emulsion drilling fluid comprising emulsifying a mixture comprising an oil phase, an aqueous phase, and the spray dried emulsifier of claim 17.

27. The method of claim 26, wherein the mixture comprises from about 1% by weight to about 5% by weight of the spray dried emulsifier.

28. The method of claim 26, wherein the mixture comprises from about 5% by weight to about 40% by weight of the aqueous phase.

29. The method of claim 26, wherein the aqueous phase is a brine solution comprising a salt selected from the group consisting of sodium chloride, potassium chloride, magnesium chloride, calcium chloride, and mixtures thereof.

30. An invert emulsion drilling fluid prepared according to the method of claim 26.

31. A method for oil or gas well drilling, comprising:

flowing an invert emulsion drilling fluid through a drill bit to the bottom of a bore hole, wherein the invert emulsion drilling fluid is prepared according to the method of claim 26.

32. The method of claim 31, wherein the invert emulsion drilling fluid is recovered at the top of the bore hole and at least a portion of the invert emulsion drilling fluid is recirculated back through the drill bit.

33. A method for preparing a spray dried emulsifier, comprising:

neutralizing a blend of a carboxylic acid terminated fatty amine condensate, a modified tall oil, and water to produce a neutralized aqueous composition having a pH of about 8 to about 11.5, wherein the carboxylic acid terminated fatty amine condensate is prepared by reacting a fatty acid amine condensate with a polycarboxylic acid or a carboxylic acid anhydride; and spray drying the neutralized aqueous composition to produce a spray dried emulsifier having an average particle size of about 0.5 μm to about 150 μm.

34. The method of claim 33, further comprising reacting a tall oil distillate component with an unsaturated polycarboxylic acid or an unsaturated carboxylic anhydride to prepare the modified tall oil.

35. The method of claim 34, further comprising condensing a mixture comprising one or more fatty acids and one or more polyalkylene polyamines to prepare the fatty acid amine condensate.

36. A method for preparing a spray dried emulsifier, comprising:

neutralizing a blend of a carboxylic acid terminated fatty amine condensate, a modified tall oil, and water to produce a neutralized aqueous solution or dispersion having a pH of about 8 to about 11.5, wherein the carboxylic acid terminated fatty amine condensate is prepared by reacting a fatty acid amine condensate with a polycarboxylic acid or a carboxylic acid anhydride, and wherein the neutralized aqueous solution or dispersion has a solids content of about 50% by weight or less; and spray drying the neutralized aqueous composition to produce a spray dried emulsifier.

37. The method of claim 36, further comprising reacting a tall oil distillate component with an unsaturated polycarboxylic acid or an unsaturated carboxylic anhydride to prepare the modified tall oil.

* * * * *